United States Patent [19]
Webster et al.

[11] 3,852,683
[45] Dec. 3, 1974

[54] ARYLIDENE DYE LASERS
[75] Inventors: Frank G. Webster; William C. McColgin, both of Rochester, N.Y.
[73] Assignee: Eastman Kodak Company, Rochester, N.Y.
[22] Filed: Sept. 1, 1972
[21] Appl. No.: 285,701

Related U.S. Application Data
[63] Continuation-in-part of Ser. No. 190,330, Oct. 18, 1971, abandoned.

[52] U.S. Cl. ... 331/94.5 L, 252/301.2 R, 260/240 R
[51] Int. Cl. ............................................. H01s 3/00
[58] Field of Search .......... 252/301.2 R; 331/94.5 L

[56] References Cited
UNITED STATES PATENTS

| | | | |
|---|---|---|---|
| 3,521,187 | 7/1970 | Snavely et al. | 252/301.2 R |
| 3,539,349 | 11/1970 | Brooker et al. | 96/130 |
| 3,541,470 | 11/1970 | Lankard et al. | 252/301.2 R |
| 3,679,995 | 7/1972 | Sorokin | 331/94.5 L |

OTHER PUBLICATIONS

Sorokin, Sci. Amer., 220(2), 1969, p. 30, 33–40.
Lempicki et al. "Lasers," Marcel Dekker Inc., N.Y., N.Y. 1966, Vol. 1, p. 186, 196, 197, 246.
Bass et al. "Lasers" Marcel Dekker, Inc., N.Y., N.Y., 1971, Vol. 3, p. 269–272, 278–284.

*Primary Examiner*—Patrick P. Garvin
*Assistant Examiner*—A. P. Demers
*Attorney, Agent, or Firm*—D. M. DeLeo

[57] ABSTRACT

Arylidene dyes of the merocyanine type are useful as laser dyes. These dyes are used in solution with a non-interfering solvent to form lasing media useful in dye lasers. Such lasers generally include a reservoir for containing the laser dye solution and a pumping energy source operably associated therewith for producing stimulated emission of the laser dye solution.

20 Claims, No Drawings

ARYLIDENE DYE LASERS

This is a continuation-in-part of Ser. No. 190,330, filed Oct. 18, 1971 now abandoned.

This invention relates to lasers and more particularly to organic dye lasers and to the use of certain rigidized nitrogen-containing dyes capable of lasing when properly excited.

Lasers (acronym for light amplification by stimulated emission of radiation) or optical masers (acronym for microwave amplification by stimulated emission of radiation) are light amplifying devices which produce high intensity coherent monochromatic light concentrated in a well collimated beam commonly called a laser beam. There are several uses for such laser beams. Since the beam can be sharply focused, it can produce energy densities suitable for drilling, welding, cutting, etc. One potential application of laser beams is in the field of communications where the optical spectrum represents almost limitless bandwidth and information carrying capacity.

It is desirable to have lasers which are operable at many different wavelengths in the light spectrum including infrared, visible and ultraviolet regions. Since the wavelength emitted by a specific energy transition in a laser medium is tunable over only a small portion of the spectrum, it is necessary to provide a number of materials adapted for use as active laser media at various light frequencies. Many of the materials discovered thus far which are capable of acting as laser media have been in the solid and gaseous states. It is also known that certain organic dyes in solution can operate as "liquid" or "organic dye" lasers. Of the range of materials useful as lasing media, organic lasing dyes provide certain advantages. A wide range of organic dye lasers is available to provide stimulated emission (lasing) over a broad range of the spectrum. Secondly, organic dye lasers are generally capable of being tuned to emit over a range of wavelengths, this being in contradistinction to the essentially single wavelength capability of lasing emission characterizing gas and solid lasers. Thirdly, organic dye lasers provide an economical lasing medium when compared to gas and solid lasers, and they do not suffer from disadvantages such as cracking and optical imperfections that are particularly associated with solid lasers.

The ability to selectively tune organic dye lasers derives from the broad band fluorescence characteristic of the component dye. Such lasers can be "tuned" to emit at wavelengths along substantially the entire fluorescence band of the dye by interposing a dispersive element such as a diffraction grating or a prism.

The operation of a laser is achieved as a result of the phenomenon that excited atoms or molecules can emit a photon or quantum of light, which photon or quantum can itself trigger another excited atom or molecule to emit its photon prematurely. This process is designated stimulated emission.

The excitation of organic lasing dyes can be achieved by subjecting the dye, under controlled conditions such as will be described herein, to a suitable source of energy such as bombarding it with electrons or illuminating it with a high energy source. Conventionally, illumination is utilized for liquid laser materials. Excitation of a liquid laser medium by illumination is generally termed "optical pumping" or merely "pumping". Pumping sources include, for example, sources such as giant pulse lasers, xenon and argon arc flash tubes as well as arc discharge tubes containing only air or other gaseous mixtures.

Various arrangements of laser apparatus can be used. A laser structure particularly adapted for organic dye liquid laser media is described by Sorokin et al, *IBM Journal*, V. 11, p. 148 (1967). Advantageous laser apparatus structures usually include an optically resonant cavity containing a reservoir of a liquid laser medium or a liquid laser body disposed within a thin-walled quartz cylinder. Typically, the reservoir is part of a closed system through which the dye solution is circulated during lasing operation. Thus, localized heating which can cause refractive discontinuities and potential breakdown of the dye is effectively prevented. To provide an energy source for exciting the atoms of the laser material, the laser body can be surrounded concentrically by a lamp, such as one containing an annular region within an outer thick-walled quartz cylinder. The annular region can contain an air-argon mixture and have electrodes which are operably connected to a low inductance capacitor charged by a standard high voltage supply. Desirably, coaxially disposed at either end of the optically resonant cavity are opposed internally reflective cavity ends such as mirrors.

When optical pumping is used, the light source emits light having wavelengths within at least one absorption band of the lasing medium. The absorbed light causes molecular electrons in the medium to shift in energy level. Molecular electrons exist either in a singlet state (two electrons spinning in opposite directions) or a triplet state (two electrons spinning in the same direction). The ground state is the unexcited state for molecular electrons and has the lowest energy. Typically, the ground state in almost all molecules is a singlet (designated $S^0$), one of many possible energy levels in the singlet state. When the pumping source is activated, the resultant light pulse enters the laser body and photons of energy of appropriate absorptive wavelength are absorbed by active molecules in the body and cause the electrons of such molecules to shift from an initial low energy level ($S^0$) to a high energy level from which emissive transition occurs.

In operation, the molecular electrons of the laser medium are desirably "pumped" to higher excited states of the singlet system by intense energy inputs. It is thought that they then first undergo transitions from such excited states to the lowest excited state (designated $S^1$). After diminishing in energy level to the lowest excited singlet, the molecule can relinquish its remaining excess energy radiatively or non-radiatively from $S^1$ to $S^0$, non-radiatively from $S^1$ to a triplet state and then radiatively or non-radiatively from the lowest excited triplet state to $S^0$. Generally, laser emission consists or optical emission resulting from transitions from $S^1$ to various vibrational modes of $S^0$. Susceptibility to triplet formation upon pumping is deleterious due to typical non-radiative energy losses resulting from triplet to $S^0$ transitions. Also, if there is significant overlap between the triplet absorption and either the pump bands or lasing emission bands, laser action generally will be impeded or will fail entirely. Additionally, advantageous laser emission can occur only when the population of molecules established at this higher energy level in the laser body by such light pumping exceeds the population of molecules remaining at the initial low energy level, a condition conventionally designated "population inversion" or "inversion of energy states."

Upon reaching an inversion of energy states, individual molecules of the high energy level population undergo emissive transition spontaneously, shifting to a terminal low energy level as described herein with a concomitant emission of light. A portion of the spontaneously emitted light is usually reflected back and forth through a resonant optical cavity structure, such as previously described, between its internally reflective ends. As this light passes through the laser body in multiple bidirectional reflections, it induces other molecules of the enlarged high energy level population to undergo premature light emissive transitions as noted herein. This produces more light, which augments the bidirectionally reflected light in the cavity to induce still further light emissive transitions. A rising pulse of bidirectionally reflected light quickly develops in the cavity, reaching a quantitatively large value as the induced emissive transition of molecules from the high energy level population increases. If one of the reflective cavity ends is partially transmissive, as is typically the case, a portion of the intense reflected light pulse passes through the one end and out of the cavity to constitute the laser output light pulse or the laser beam.

Although many advances have been made in the field of organic dye lasers, we have now found a new class of lasing dyes. It is, therefore, an object of this invention to provide a novel class of lasing dyes which, upon lasing, emit at a variety of wavelengths.

Another object of this invention is to provide novel liquid lasing media.

These and other objects and advantages are obtained through the use, with dye lasers having a reservoir means containing a laser dye solution and a pumping energy source capable of producing stimulated emission of the solution which coomprises a lasing concentration of dye in a non-interfering solvent (i.e., one that does not inhibit stimulated emission), of a laser dye containing an arylidene moiety attached to a polymethine chain.

The dyes useful in this invention can be represented by the structural formulas:

cluding substituted alkyl radicals, e.g., alkoxycarbonylalkyl, hydroxycarbonylalkyl, etc, and R together with $R^5$ and/or $R^1$ together with $R^2$ represent the carbon atoms necessary to complete a fused 5-, 6- or 7-membered saturated heterocyclic nucleus, which together with the phenylene radical to which the nitrogen is attached, can form such radicals as julolidyl, 5-indolinyl, 6-(1,2,3,4-tetrahydroquinolyl), 3-carbazolyl. etc;

$R^2$ and $R^5$ each represent a hydrogen atom when $R^1$ or R, respectively, is a hydrogen atom or an alkyl radical;

$R^3$, $R^4$, D and D' each represent a member selected from the group consisting of a cyano radical, an alkoxycarbonyl radical having from one to about four carbon atoms in the alkyl moiety, an acyl radical having one to about four carbon atoms in the alkyl portion and including aracyl radicals (e.g., phenylcarbonyl, etc), a substituted sulfonyl radical having such substituents as alkyl radicals having one to five carbon atoms, aryl radicals and aryloxy radicals and when $R^3$ and $R^4$ or D and D' are taken together with the carbon atom to which they are attached, represent a radical having the structure:

III. 

wherein Q represents the non-metallic atoms necessary to complete a 5- or 6-membered ring of the type used in merocyanine dyes and typically contains at least one hetero atom selected from nitrogen, oxygen, sulfur or selenium. Exemplary heterocyclic nuclei of the type used in merocyanine dyes and as represented by Formula III above, include an isoxazolinone nucleus (e.g., 3-phenyl-2-isoxazolin-5-one, 3-methyl-2-isoxazolin-5-one, etc.), an oxinodole nucleus (e.g., 1-alkyl-2,3-dihydro-2-oxindoles, etc), a 2,4,6-triketohexahydropyrimidine nucleus (e.g., barbituric acid or 2-thiobarbituric acid, as well as their 1-alkyl (e.g., 1-methyl, 1-ethyl, 1-n-propyl, 1-n-heptyl, etc), or 1,3-dialkyl (e.g., 1,3-dimethyl, 1,3-diethyl, 1,3-di-n-propyl, 1,3-diisopropyl, 1,3dicyclohexyl, 1,3-di(2-

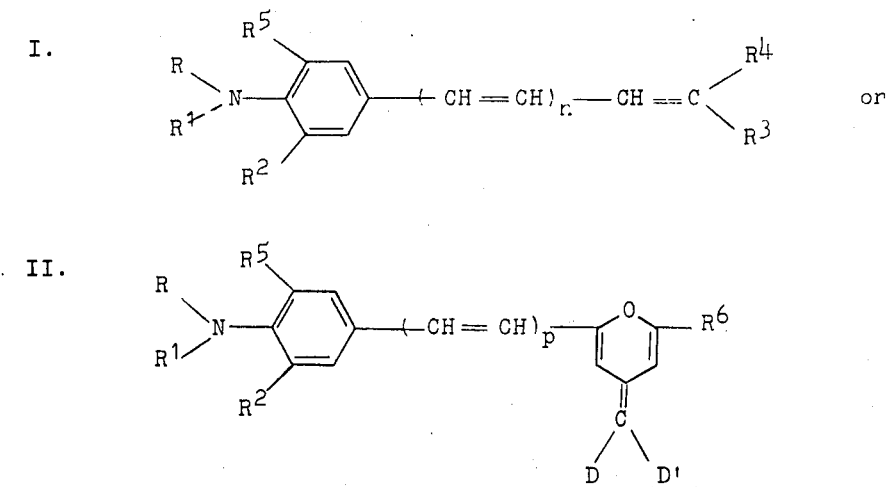

wherein:
n represents an integer having a value of 0, 1 or 2;
p represents an integer having a value of 1 or 2;
R and $R^1$ each represent a hydrogen atom or an alkyl radical having from one to about six carbon atoms inmethoxyethyl), 1,3-di(dialkylaminoalkyl), 1-alkyl-3-(2-morpholinoalkyl), etc), or 1,3-diaryl (e.g., 1,3-diphenyl, 1,3-di(4-chlorophenyl), 1,3-di-(4-ethoxycarbonylphenyl), 1,3-di(dialkylaminophenyl), etc), or 1-aryl (e.g., 1-phenyl, 1-p-chlorophenyl, 1-p-ethoxycarbonylphenyl, etc), or 1-alkyl-3-aryl (e.g., 1-ethyl-3-phenyl, 1-(n-heptyl-3-phenyl), etc) derivatives, a 2(3H)-imidazo[1,2-a]pyridone nucleus; a 5,7-dioxo-6,7-dihydro-5-thiazolo[3,2-a]pyrimidine nucleus (e.g., 5,7-dioxo3-phenyl-6,7-dihydro-5-thiazolo[3,2-a]pyrimidine nucleus), a 2-thio-2,4-oxazolidinedione nucleus (i.e., a 2-thio-2,4-(3H,5H)-oxazoledione nucleus) (e.g., 3-ethyl-2-thio-2,4-oxazolidinedione, etc), a thianaphthenone nucleus (e.g., 3(2H)-thianaphthenone, 3(2H)-thianaphthenone-1,1-dioxide, etc), a 2-thio-2,5-triazolidinedione nucleus (i.e., a 2-thio-2,5-(3H,4 H)-thiazoledione nucleus) (e.g., 3-ethyl-2-thio-2,5-(3H,4H)-thia-zolidinedione, etc), a 2,4-thiazolidinedione nucleus (e.g., 2,4-thiazolidinedione, 3-ethyl-2,4-thiazolidinedione, 3-phenyl-2,4-thiazolidinedione, 3-$\alpha$-naphthyl2,4-thiazolidinedione, etc.), a thiazolidinone nucleus (e.g., 4-thiazolidinone, 3ethyl-4-thiazolidinone, 3-phenyl-4-thiazolidinone, 3-$\alpha$-naphthyl-4-thiazolinone, etc), a 4-thiazolinone nucleus (e.g., 2-ethylmercapto5-thiazolin-4-one, 2-alkylphenylamino-5-thiazolin-4-ones, 2-diphenylamino-5-thiazolinone-4-one, etc), a 2-imino-2-oxazolin-4-one (i.e., pseudohydantoin) nucleus, a 2,4-imidazolidinedione (hydantoin) nucleus (e.g., 2,4-imidazolidinedione, 3-ethyl-2,4-imidazolidinedione, 3-phenyl-2,4-imidazolidinedione, 3-$\alpha$-naphthyl-2,4-imidazolidinedione, 1,3-diethyl-2,4-imidazolidinedione, 1-ethyl-3$\alpha$-naphthyl-2,4imidazolidinedione, 1,3-diphenyl-2,4-imidazolidinedione, etc), a 1,3-indanedione nucleus, a dione or tetrone nucleus (e.g., 1,3-dioxane-4,6-dione, 2H-pyran-2,4,5,7-(1H,3H,6H)tetrone, etc), a 2-imidazolin-5-one nucleus (e.g., (2-n-propylmercapto-2-imidazolin-5-one, etc), etc. Especially useful are nuclei wherein Q represents the non-metallic atoms necessary to complete a 5- or 6-membered heterocyclic ring having 2 hetero atoms at least one of which is nitrogen and the other is selected from nitrogen, oxygen or sulfur;

$R^6$ represents a hydrogen atom, an alkyl radical having one to about six carbon atoms, preferably one to about two carbon atoms, and a monocyclic aryl radical, e.g., phenyl and substituted phenyl.

As used herein, the term "lasing concentration" refers to a concentration sufficient to promote, under appropriate conditions such as those mentioned herein, stimulated emission of the laser dye solution. Generally, concentrations of from about $10^{-1}$ to $10^{-5}$ molar are employed, with solutions of from $10^{-2}$ to $10^{-4}$ molar concentrations being preferred for maximum output energies. Still wider variations in concentration can be used for particular operations, if desired.

Representative useful non-interfering solvents which do not inhibit stimulated emission are water; alkanols, including mono-, di- and polyhydric alcohols containing from one to about six carbon atoms and preferably from two to about four carbon atoms, e.g., methanol, ethanol, isopropanol, isopropanediol, butanol, etc; and aryl alcohols such as various benzene derivatives wherein the hydroxy radical is attached directly to the aryl nucleus or is attached thereto through an alkylene moiety having from one to about four carbon atoms, e.g., phenol, methylphenol, resorcinol, phenylcarbinol, methylphenylcarbinol, etc. Other solvents include fluorinated organic alcohols corresponding to the alcohols described above and discussed further in copending Drexhage application Ser. No. 149,055, filed June 1, 1971, and entitled *LASER MEDIA CONTAINING FLUORINATED ALCOHOLS*, also heterocyclic compounds having a nitrogen heteroatom (e.g., pyridine, 2,6-dimethylpyridine, etc), and lower alkyl ketones such as dimethylketone. Additional useful solvents include alkyl substituted solvents such as dimethylsulfoxide, dimethylacetamide, dimethylformamide and the like. Of course, combinations of liquids can be used as can other solvents known to be useful in the dye laser art.

The present lasing media can be used in a variety of laser apparatus. A laser structure particularly adapted for testing organic dye liquid laser media is that described by Sorokin et al, *IBM Journal*, (supra). For continuous operation, the present lasing media can be used in apparatus of the type described in copending application of S. A. Tuccio and O. G. Peterson, Ser. No. 117,595, filed Feb. 22, 1971 and entitled *CW ORGANIC DYE LASER* now U.S. Pat. No. 3,736,542.

The following examples are included for a further understanding of the invention. Unless otherwise stated, the excitation source in the following examples is a giant pulse from a 530.0 nm. frequency doubled, neodymium glass laser. The dye lasing medium is placed in a cuvette which is located between two dielectric mirrors which form a nearly hemispherical dye laser cavity. The light from the excitation or pumping source passes through one of the dielectric mirrors into the dye-containing cuvette and along the optical axis of the cavity. A beam splitter is used to sample the output from the excitation source in order to determine the wavelength of lasing.

Example 1

The dye p-dimethylaminocinnamylidenebenzoylacetonitrile is mixed in acetone to an optical density of about 2.0 in a 5 cm. dye cuvette. The cuvette is placed between two dielectric mirrors as described above. The dye lases at a wavelength of about 622 nm.

Example 2

Example 1 is repeated except that the dye is 5-p-dimethylaminocinnamylidenebarbituric acid in pyridine solvent. The dye lases at about 620 nm.

Example 3

Example 1 is repeated except that the dye is 5-p-dimethylaminocinnamylidene-1,3-diphenylbarbituric acid, with pyridine as the solvent. The dye lases at about 628 nm.

Example 4

Example 1 is repeated except that the dye is 3-p-dimethylaminocinnamylidene-2,4-chromandione in pyridine. The dye lases at about 655 nm.

Example 5

Example 1 is repeated except that the dye is 3-p-dimethylaminocinnamylidene-7-methyl-2,4-chromandione, with acetone as the solvent. The dye lases at about 645 nm.

Example 6

Example 1 is repeated except that the dye is 2-p-dimethylaminocinnamylidene-5,5-dimethylcyclohexan-1,3-dione, with acetone as the solvent. The dye lases at about 618 nm.

Example 7

Example 1 is repeated except that the dye is 5-p-dimethylaminocinnamylidene-2,2-dimethyl-1,3- dioxane-4,6-dione, with acetone as the solvent. The dye lases at about 603 nm.

Example 8

Example 1 is repeated except that the dye is 3-cyano-5-p-dimethylaminocinnamylidene-4-phenyl-2(5H)-furanone, with methanol as the solvent. The dye lases at about 745 nm.

Example 9

Example 1 is repeated except that the dye is 3-p-dimethylaminocinnamylidene-imidazo[1,2-a]pyridin-2(3H)-one, with pyridine as the solvent. The dye lases at about 675 nm.

Example 10

Example 1 is repeated except that the dye is 3-p-dimethylaminocinnamylidene-imidazo[1,2-a]pyridin-2(3H)-one metho-p-toluenesulfonate, with pyridine as the solvent. The dye lases at about 730 nm.

Example 11

Example 1 is repeated except that the dye is 2-p-dimethylaminocinnamylidene-1,3-indanedione, with pyridine as the solvent. The dye lases at about 650 nm.

Example 12

Example 1 is repeated except that the dye is 4-(4-dimethylaminocinnamylidene)-2-phenyl-3,5-isoxazolidinedione, with pyridine as the solvent. The dye lases at about 637 nm.

Example 13

Example 1 is repeated except that the dye is 4-p-dimethylaminocinnamylidene-3-phenyl-2-isoxazolin-5-one, with pyridine as the solvent. The dye lases at about 640 nm. The dye also lases at about 640 nm. when tested in methanol as the solvent.

Example 14

Example 1 is repeated except that the dye is 3-(p-diethylaminophenyl)allylidenemalonitrile, with pyridine as the solvent. The dye lases at 596 nm.

Example 15

Example 1 is repeated except that the dye is 3-p-dimethylaminocinnamylidene-3,4-dihydro-2H-naphtho[1,2-b]pyran-2,4-dione, with acetone as the solvent. The dye lases at about 652 nm. When tested in pyridine, the dye lases at about 660 nm.

Example 16

Example 1 is repeated except that the dye is 3-p-dimethylaminocinnamylidene-6-methyl-2H-pyran-2,4(3H)-dione, with pyridine as the solvent. The dye lases at about 643 nm.

Example 17

Example 1 is repeated except that the dye is 2-p-dimethylaminocinnamylidenethiazolo[3,2-a]benzimidazol-3(2H)-one with acetone as the solvent. The dye lases at about 630 nm.

Example 18

Example 1 is repeated except that the dye is 5-p-diethylaminocinnamylidene-2-thiobarbituric acid, with pyridine as the solvent. The dye lases at about 650 nm.

Example 19

Example 1 is repeated except that the dye is 5-p-dimethylaminocinnamylidene-2-thiobarbituric acid, with pyridine as the solvent. The dye lases at about 660 nm.

Example 20

Example 1 is repeated except that the dye is 5-p-dimethylaminocinnamylidene-1-phenyl-2-thiobarbituric acid, with pyridine as the solvent. The dye lases at about 625 nm.

Example 21

Example 1 is repeated except that the dye is p-diethylaminocinnamylidenebenzoylacetonitrile, with pyridine as the solvent. The dye lases at about 630 nm.

Example 22

Example 1 is repeated except that the dye is p-dimethylaminocinnamylidene(3,4-dihydroxybenzoyl)acetonitrile, with acetone as the solvent. The dye lases at about 622 nm.

Example 23

Example 1 is repeated except that the dye is 2-p-dimethylaminocinnamylidene-2-methylsulfonylacetonitrile, with acetone as the solvent. The dye lases at about 582 nm.

Example 24

Example 1 is repeated except that the dye is 5-p-dimethylaminocinnamylidene-1,3-diethylbarbituric acid, with methanol as the solvent. The dye lases at about 624 nm.

Example 25

Example 1 is repeated except that the dye is 5-(p-dimethylaminocinnamylidene)-1,3-di(2-hydroxyethyl)barbituric acid, with pyridine as the solvent. The dye lases at about 625 nm.

Example 26

Example 1 is repeated except that the dye is p-diethyl-aminocinnamylidenecyanoacetic acid, ethyl ester, with acetone as the solvent. The dye lases at about 590 nm.

Example 27

Example 1 is repeated except that the dye is 2-(4-dimethylaminocinnamylidene)-1,3-cyclohexanedione, with acetone as the solvent. The dye lases at about 618 nm.

Example 28

Example 1 is repeated except that the dye is 4-acetoxy-3-(p-dimethylaminocinnamylidene)-2H-pyran-2,6(3H)-dione, with methanol as the solvent. The dye lases at about 658 nm.

Example 29

Example 1 is repeated except that the dye is 2-p-dimethylaminocinnamylidene-5-methyl-7H-thiazolo[3,2-a]pyrimidine-3,7(2H)-dione, with acetone as the solvent. The dye lases at about 655 nm.

Example 30

Example 1 is repeated except that the dye is 4-dicyanomethylene-2-methyl-6-p-dimethylaminostyryl-4H-pyran, with methanol as the solvent. The dye lases at 640 nm.

Example 31

Example 30 is repeated except the dye solution is placed in an apparatus as described in Sorokin et al. IBM Journal (supra) and found to lase at 647 nm.

Example 32

The dye of Example 30 is mixed with a solvent comprising 50 percent water and 50 percent pyridine and placed in lasing apparatus as described in U.S. Ser. No. 117,595, filed Feb. 22, 1971. This laser apparatus comprises a focused resonant cavity having a relatively small active volume. The cavity is adapted having a relatively small active volume. The cavity is adapted to permit longitudinal excitation of the lasing medium contained therein. Excitation radiation is introduced from a continuous energy source, such as an argon-ion CW laser, into the dye solution through one of the reflective mirrors comprising the cavity and is focused within the cavity at a power density sufficient to produce the necessary excited molecules. To dissipate thermal energy generated during pumping, and thereby maintain substantially constant the optical homogeneity of the dye solution, the transparent dye cell windows through which pumping energy is introduced, comprise a material of relatively high thermal conductivity, such as sapphire or beryllium oxide. Continuous emission is accomplished by flowing the lasing medium through the focused optical cavity while simultaneously producing a population inversion in that portion of the lasing medium flowing in close proximity to the focal point of the cavity. The dye lases strongly without the addition of additives.

Example 33

Example 1 is repeated except that the dye is 1,3-diethyl-5-(2-methyl-6-p-dimethylaminostyryl-4H-pyran-4-ylidene)barbituric acid, with methanol as the solvent. The dye lases at 696 nm. Useful results are obtained with the following additional dyes: 4-dicyanomethylene-6-methyl-2-[(1,2,3,4-tetrahydro-6-quinolyl)-vinyl]-4H-pyran; 4-dicyanomethylene-6-methyl-2-[(9-methyl-3-carbazolyl)vinyl]-4H-pyran; 4-dicyanomethylene-2-{[9-(1,2,6,7-tetrahydro-3H,5H-benzo[i,j]quinolizinyl)]vinyl} -6-methyl-4H-pyran; 2-{p-[bis(ethoxycarbonylmethyl)amino]styryl}-4-dicyano-methylene-6-methyl-4H-pyran; 4-dicyanomethylene-2-p-(di-n-propylamino)styryl-6-methyl-4H-pyran; and 4-dicyanomethylene-2-[(5-indolinyl)vinyl]-6-methyl-4H-pyran, with all lasing below about 725 nm.

Example 34

Example 30 is repeated except the solvent is varied. The solvents used and the wavelength of lasing obtained are as follows: pyridine — 635 nm, dimethylacetamide — 647 nm, dimethylsulfoxide — 654 nm, dimethylformamide — 646 nm.

Example 35

Example 1 is repeated twice using 5-(2-methyl-6-p-dimethylaminostyryl-4H-pyran-4-ylidene)barbituric acid as the dye and dimethylsulfoxide or dimethylformamide as the solvent with lasing occurring at 707 and 688 nm, respectively.

Example 36

Example 1 is repeated using the following dyes:
1. 4-dicyanomethylene-6-methyl-2-[(1,2,3,4-tetrahydro-6-quinolyl)vinyl]-4H-pyran;
2. 4-dicyanomethylene-6-methyl-2-[(9-methyl-3-carbazolyl)-vinyl]-4H-pyran;
3. 4-dicyanomethylene-2-{[9-(1,2,6,7-tetrahydro-3H,5H-benzo[i,j]quinolizinyl)]vinyl} 6-methyl-4H-pyran;
4. 2{p-[bis(ethoxycarbonylmethyl)amino]styryl}-4-dicyanomethylene-6-methyl-4H-pyran;
5. 4-dicyanomethylene-2-p-(di-n-propylamino)stryl-6-methyl-4H-pyran The solvent is varied using pyridine (Pyr), methanol (MeOH), dimethylsulfoxide (DMSO), dimethylformamide (DMF) or dimethylacetamide (DMA). The dye and solvent used, together with the wavelength of lasing are shown for each test:

| Test | Dye No | Solvent | Wavelength (nm) |
|------|--------|---------|-----------------|
| A | 1 | Pyr | 650 |
| B | 1 | DMSO | 664 |
| C | 1 | DMA | 654 |
| D | 2 | DMSO | 665 |
| E | 2 | DMA | 659 |
| F | 3 | Pyr | 663 |
| G | 3 | DMSO | 688 |
| H | 3 | DMF | 678 |
| I | 4 | Pyr | 618 |
| J | 4 | DMSO | 617 |
| K | 4 | MeOH | 620 |
| L | 4 | DMF | 615 |
| M | 4 | DMA | 613 |
| N | 5 | MeOH | 650 |
| O | 5 | DMSO | 654 |
| P | 5 | DMF | 658 |

The invention has been described in detail with particular reference to certain preferred embodiments thereof, but it will be understood that variations and modifications can be effected within the spirit and scope of the invention.

We claim:

1. In a dye laser comprising means containing a laser dye solution and a pumping energy source operably coupled therewith for producing a population inversion in said solution and means optically coupled with said solution for stimulating emission therefrom during said population inversion, the improvement of having said solution comprise, in a lasing concentration and in a non-interfering solvent, a lasing dye having a formula as follows:

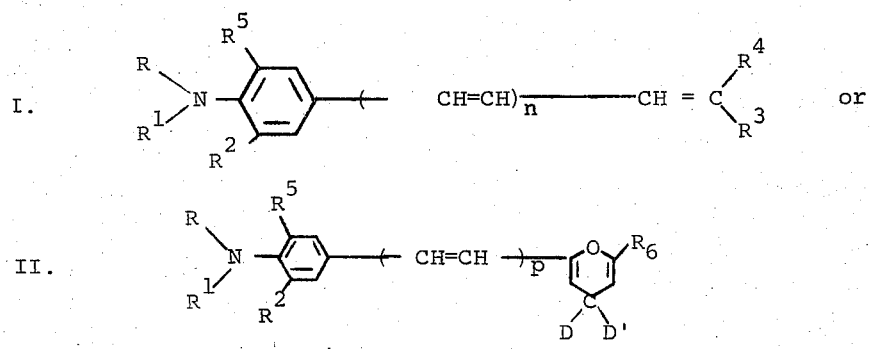

wherein:
  $n$ represents an integer having a value of 0, 1 or 2;
  $p$ represents an integer having a value of 1 or 2;
  R and $R^1$ each represent a hydrogen atom or an alkyl radical and when R and $R^5$ or $R^1$ and $R^2$ are taken together, represent the atoms necessary to complete, together with the phenylene radical to which the nitrogen is attached, a julolidyl radical, a 5-indolinyl radical, a 6-(1,2,3,4-tetrahydroquinolyl) radical, or a 3-carbazolyl radical;
  $R^2$ and $R^5$ each represent a hydrogen atom when $R^1$ or R, respectively, is a hydrogen atom or an alkyl radical;
  $R^3$, $R^4$, D and D' each represent a member selected from the group consisting of a cyano radical, an alkoxycarbonyl radical, an acyl radical, a substituted sulfonyl radical and when $R^3$ and $R^4$ or D and D' are taken together with the carbon atom to which they are attached, represent a radical of the structure:

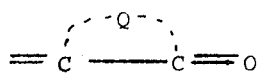

in which Q represents the non-metallic atoms necessary to complete a 5- or 6-membered nucleus selected from the group consisting of an isoxazolinone nucleus, an oxindole nucleus, a 2,4,6-triketohexa-hydropyrimidine nucleus, a 2(3H)-imidazo[1,2-a]pyridone nucleus, a 5,7-dioxo-6,7-dihydro-5-thiazolo[3,2-a]pyrimidine nucleus, a 2-thio-2,4-oxazolidinedione nucleus, a thianaphthenone nucleus, a 2-thio-2,5-thiazolidinedione nucleus, a 2,4-thiazolidinedione nucleus, a thiazolidinone nucleus, a 4-thiazolinone nucleus, a 2-imino-2-oxazolin-4-one nucleus, a 2,4-imidazolidinedione nucleus, a 1,3-indanedione nucleus, a dioxanedione nucleus and a pyrantetrone nucleus; and $R^6$ represents a hydrogen atom, an alkyl radical or a monocyclic aryl radical.

2. The invention as described in claim 1 wherein said dye is present in a concentration of about $10^{-2}$ to $10^{-4}$ molar.

3. The invention as described in claim 1 wherein n and p each equal 1, R and $R^1$ each represent a hydrogen atom, an alkyl radical of one to about six carbon atoms and when taken together with $R^5$ and $R^2$, respectively, represent the carbon atoms necessary together with the phenylene moiety to which $R^5$ and $R^2$ are attached to complete a julolidyl radical.

4. The invention as described in claim 1 wherein $R^3$, $R^4$, D and D' each represent a cyano radical and when $R^3$ and $R^4$ or D and D' are taken together with the carbon atom to which they are attached, represent the atoms necessary to complete a 2,4,6-triketohexahydropyrimidine nucleus.

5. A method of producing coherent laser emission in the operation of a dye laser in the wavelength range of from about 500 to about 800 nm comprising the step of optically pumping a dye solution to produce a population inversion in said solution and stimulate emission of radiation therefrom, said solution containing between about $10^{-2}$ to about $10^{-4}$ molar concentration of a lasing dye in a non-interfering solvent, said dye having a formula as follows:

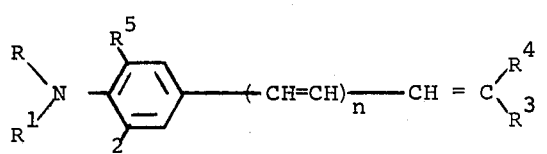

or

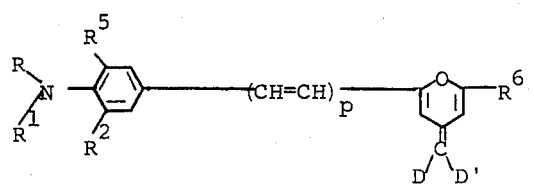

wherein:

n represents an integer having a value of 0, 1 or 2;

p represents an integer having a value of 1 or 2;

R and $R^1$ each represent a hydrogen atom or an alkyl radical and when R and $R^5$ or $R^1$ and $R^2$ are taken together, represent the atoms necessary to complete, together with the phenylene radical to which the nitrogen is attached, a julolidyl radical, a 5-indolinyl radical, a 6-(1,2,3,4-tetrahydroquinolyl) radical, or a 3-carbazolyl radical;

$R^2$ and $R^5$ each represent a hydrogen atom when $R^1$ or R, respectively, is a hydrogen atom or an alkyl radical;

$R^3$, $R^4$, D and D' each represent a member selected from the group consisting of a cyano radical, an alkoxycarbonyl radical, an acyl radical, a substituted sulfonyl radical and when $R^3$ and $R^4$ or D and D' are taken together with the carbon atom to which they are attached, represent a radical of the structure:

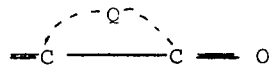

in which Q represents the non-metallic atoms necessary to complete a 5- or 6-membered nucleus selected from the group consisting of an isoxazolinone nucleus, an oxindole nucleus, a 2,4,6--triketo-hexahydropyrimidine nucleus, a 2(3H)-imidazo-[1,2-a]pyridone nucleus, a 5,7-dioxo-6,7-dihydro-5-thiazolo[3,2-a] pyrimidine nucleus, a 2-thio-2,4-oxazolidinedione nucleus, a thianaphthenone nucleus, a 2-thio-2,5-thiazolidinedione nucleus, a 2,4-thiazolidinedione nucleus, a thiazolidinone nucleus, a 4-thiazoli-none nucleus, a 2-imino-2-oxazolin-4-one nucleus, a 2,4-imidazolidinedione nucleus, a 1,3-indanedione nucleus, a dioxanedione nucleus and a pyrantetrone nucleus; and $R^6$ represents a hydrogen atom, an alkyl radical or a monocyclic aryl radical.

6. The invention as described in claim 5 wherein said dye is present in a concentration of about $10^{-2}$ to $10^{-4}$ molar.

7. The invention as described in claim 5 wherein n and p each equal 1, R and $R^1$ each represent a hydrogen atom, an alkyl radical of one to about six carbon atoms and when taken together with $R^5$ and $R^2$, respectively, represent the carbon atoms necessary together with the phenylene moiety to which $R^5$ and $R^2$ are attached to complete a julolidyl radical.

8. The invention as described in claim 5 wherein $R^3$, $R^4$, D and D' each represent a cyano radical and when $R^3$ and $R^4$ or D and D' are taken together with the carbon atom to which they are attached represent the atoms necessary to complete a 2,4,6-triketohexahydropyrimidine nucleus.

9. A method of producing coherent laser emission in the operation of a dye laser in the wavelength range of from about 500 to about 800 nm. comprising the step of optically pumping a dye solution to produce a population inversion in said solution and stimulate emission of radiation therefrom, said solution containing between about $10^{-2}$ to about $10^{-4}$ molar concentration of a lasing dye in a non-interfering solvent, said dye having a formula as follows:

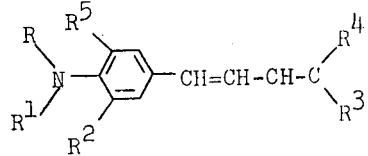

wherein:

R and R¹ each represent a hydrogen atom, an alkyl radical of one to about six carbon atoms and when taken together with R⁵ and R², respectively, and the phenylene radical to which R⁵ and R² are attached, represent the atoms necessary to complete a julolidyl radical;

R² and R⁵ are each hydrogen when R¹ or R, respectively, is a hydrogen atom or any alkyl radical; and one of R³ and R⁴ is a cyano radical and the other is a radical selected from the group consisting of a cyano radical, an acyl radical, an alkoxycarbonyl radical having one to about four carbon atoms in the alkyl moiety and an alkylsulfonyl radical having one to five carbon atoms in the alkyl moiety and when R³ and R⁴ are taken together with the carbon atom to which they are attached, represent the atoms necessary to complete a 1,3-indandione nucleus or a 2,4,6-triketohexahydropyrimidine nucleus.

10. A method of producing coherent laser emission in the operation of a dye laser in the wavelength range of from about 500 to about 800 nm, comprising the step of optically pumping a dye solution to produce a population inversion in said solution and stimulate emission of radiation therefrom, said solution containing between about $10^{-2}$ to about $10^{-4}$ molar concentration of a lasing dye in a non-interfering solvent, said dye having a formula as follows:

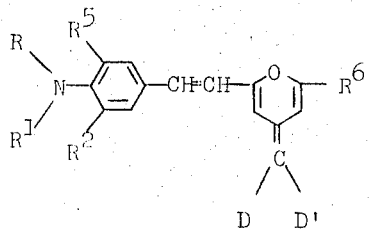

wherein:

R and R¹ each represent a hydrogen atom, an alkyl radical of one to about six carbon atoms and when taken together with R⁵ and R², respectively, and the phenylene radical to which R⁵ and R² are attached, represents the atoms necessary to complete a julolidyl radical;

R² and R⁵ are each hydrogen when R¹ or R, respectively, is a hydrogen atom or an alkyl radical;

D and D' each represent a cyano radical and when D and D' are taken together with the carbon atom to which they are attached, represent the atoms necessary to complete a 2,4,6-triketohexahydropyrimidine nucleus; and R⁶ is an alkyl radical of one to about six carbon atoms.

11. The method as described in claim 9 wherein said solvent is selected from dimethyl sulfoxide, dimethylformamide and dimethylacetamide.

12. The method as described in claim 10 wherein said solvent is selected from dimethyl sulfoxide, dimethylformamide and dimethylacetamide.

13. The invention as described in claim 10 wherein R and R¹ each represent an alkyl radical of one to about six carbon atoms, D and D' each represent a cyano radical and R⁶ represents an alkyl radical of one to about two carbon atoms.

14. The invention as described in claim 10 wherein said dye is 4-dicyanomethylene-2-methyl-6-p-dimethylaminostyryl-4H-pyran.

15. In a dye laser comprising means containing a laser dye solution and a pumping energy source operably coupled therewith for producing a population inversion in said solution and means optically coupled with said solution for stimulating emission therefrom during said population inversion, the improvement of having said solution comprise in a lasing concentration and in a non-interfering solvent, a lasing dye having the following formula:

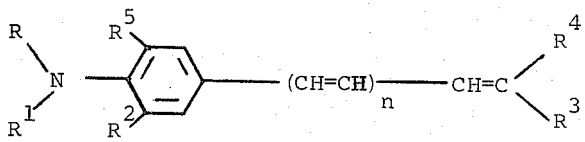

wherein:

n represents an integer having a value of 0, 1 or 2;

R and R¹ each represent a hydrogen atom or an alkyl radical of one to about six carbon atoms and when R and R⁵ or R₁ and R² are taken together, represent the atoms necessary to complete, together with the phenylene radical to which the nitrogen is attached, a julolidyl radical, a 5-indolinyl radical, a 6-(1,2,3,4-tetrahydroquinolyl) radical, or a 3-carbazolyl radical;

R² and R⁵ each represent a hydrogen atom when R¹ or R, respectively, is a hydrogen atom or an alkyl radical; and R³ and R⁴ each represent a member selected from the group consisting of a cyano radical, an alkoxycarbonyl radical having 1 to about 4 carbon atoms in the alkyl moiety, an acyl radical, an alkylsulfonyl radical having one to five carbon atoms in the alkyl moiety and when R³ and R⁴ are taken together with the carbon atom to which they are attached, represent a radical of the structure:

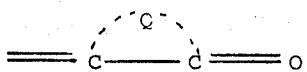

in which Q represents the non-metallic atoms necessary to complete a 5- or 6-membered nucleus selected from the group consisting of an isoxazolinone nucleus, an oxindole nucleus, a 2,4,6-triketohexahydropyrimidine nucleus, a 2(3H)-imidazo-[1,2-a]pyridone nucleus, a 5,7-dioxo-6,7-dihydro-5-thiazolo[3,2-a]pyrimidine nucleus, a 2-thio-2,4-oxazolidinedione nucleus, a thianaphthenone nucleus, a 2-thio-2,5-thiazolidinedione nucleus, a 2,4-thiazolidinedione nucleus, a thiazolidinone nucleus, a 4-thiazolinone nucleus, a 2-imino-2-oxazolin-4-one nucleus, a 2,4-imidazolidinedione nucleus, a 1,3-indanedione nucleus, a dioxanedione nucleus and a pyrantetrone nucleus.

16. The invention as described in claim 15 wherein n equals 1, R and R¹ each represent a hydrogen atom or an alkyl radical of one to about six carbon atoms and R³ and R⁴, when taken together with the carbon atom to which they are attached, represent the atoms necessary to complete a 1,3-indanedione nucleus or a 2,4,6-triketohexahydropyrimidine nucleus.

17. In a dye laser comprising means containing a laser dye solution and a pumping energy source operably coupled therewith for producing a population inversion in said solution and means optically coupled with said solution for stimulating emission therefrom during said population inversion, the improvement of having said solution comprise, in a lasing concentration and in a non-interfering solvent, a lasing dye having the following formula:

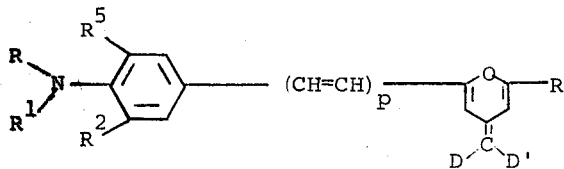

wherein:

p represents an integer having a value of 1 or 2;

R and $R^1$ each represent a hydrogen atom or an alkyl radical of one to about six carbon atoms and when R and $R^5$ or $R^1$ and $R^2$ are taken together, represent the atoms necessary to complete, together with the phenylene radical to which the nitorgen is attached, a julolidyl radical, a 5-indolinyl radical, a 6-(1,2,3,4-tetrahydroquinolyl) radical, or a 3-carbazolyl radical;

$R^2$ and $R^5$ each represent a hydrogen atom when $\overline{R^1}$ or R, respectively, is a hydrogen atom or an alkyl radical;

D and D' each represent a member selected from the group consisting of a cyano radical, an alkoxycarbonyl radical having one to about four carbon atoms in the alkyl moiety, an acyl radical, an alkylsulfonyl radical having one to five carbon atoms in the alkyl moiety, and when D and D' are taken together with the carbon atom to which they are attached, represent a radical of the structure:

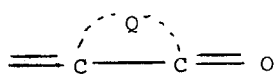

in which Q represents the non-metallic atoms necessary to complete a 5- or 6-membered nucleus selected from the group consisting of an isoxazolinone nucleus, an oxindole nuclues, a 2,4,6-triketohexahydropyrimidine nucleus, a 2 (3H)-imidazo[1,2-a]pyridone nucleus, a 5,7-dioxo-6,7-dihydro-5-thiazolo[3,2-a]pyrimidine nucleus, a 2-thio-2,4-oxazolidinedione nucleus, a thianaphthenone nucleus, a 2-thio-2,5-thiazolidinedione nucleus, a 2,4-thiazolidinedione nucleus, a thiazolidinone nucleus, a 4-thiazolinone nucleus, a 2-imino-2-oxazolin-4-one nucleus, a 2,4-imidazolidinedione nucleus, a 1,3-indanedione nucleus, a dioxanedione nucleus and a pyrantetrone nucleus; and $R^6$ represents a hydrogen atom, an alkyl radical of one to about six carbon atoms or a monocyclic aryl radical.

18. The invention as described in claim 17 wherein p equals 1, R and $R^1$ each represent a hydrogen atom, an alkyl radical of one to about six carbon atoms, D and D' each represent a cyano radical and, when D and D' are taken together with the carbon atom to which they are attached, represent the atoms necessary to complete a 2,4,6-triketohexahydropyrimidine nucleus, and $R^6$ represents a hydrogen atom or an alkyl radical of one to about two carbon atoms.

19. A method of producing coherent laser emission in the operation of a dye laser in the wavelength range of from about 500 to about 800 nm. comprising the step of optically pumping a dye solution to produce a population inversion in said solution and stimulate emission of radiation therefrom, said solution containing between about $10^{-2}$ to about $10^{-4}$ molar concentration of a lasing dye in a non-interfering solvent, said dye being selected from the group consisting of p-dimethylaminocinnamylidenebenzoylacetonitrile, 5-p-dimethylaminocinnamylidenebarbituric acid, 5-p-dimethylaminocinnamylidene-1,3-diphenylbarbituric acid, 3-p-dimethylaminocinnamylidene-2,4-chromandione, 3-p-dimethylaminocinnamylidene-7-methyl-2,4-chromandione, 2-p-dimethylaminocinnamylidene-5,5-dimethylcyclohexan-1,3-dione, 5-p-dimethylaminocinnamylidene-2,2-dimethyl-1,3-dioxane-4,6-dione, 3-cyano-5-p-dimethylaminocinnamylidene-4-phenyl-2(5H)-furanone, 3-p-dimethylaminocinnamylidene-imidazo[1,2-a]pyridin-2(3H)-one, 3-p-dimethylaminocinnamylidene-imidazo[1,2-a]pyridin-2(3H)-one metho-p-toluenesulfonate, 2-p-dimethylaminocinnamylidene-1,3-indanedione, 4-(4-dimethylaminocinnamylidene)-2-phenyl-3,5-isoxazolidinedione, 4-p-dimethylaminocinnamylidene-3-phenyl-2-isoxazolin-5-one, 3-p-(diethylaminophenyl)allylidenemalonitrile, 3-p-dimethylaminocinnamylidene-3,4-dihydro-2H-naphtho[1,2-b]-pyran-2,4-dione, 3-p-dimethylaminocinnamylidene-6-methyl-2H-pyran-2,4-(3H)-dione, 2-p-dimethylaminocinnamylidene-thiazolo[3,2-a]benzimidazol-3(2H)-one, 5-p-diethylaminocinnamylidene-2-thiobarbituric acid, 5-p-dimethylaminocinnamylidene-2-thiobarbituric acid, 5-p-dimethylaminocinnamylidene-1-phenyl-2-thiobarbituric acid, p-diethylaminocinnamylidenebenzoylacetonitrile, p-dimethylaminocinnamylidene(3,4-dihydroxybenzoyl)acetonitrile, 2-p-dimethylaminocinnamylidene-2-methylsulfonylacetonitrile, 5-p-dimethylaminocinnamylidene-1,3-diethylbarbituric acid, 5-(p-dimethylaminocinnamylidene)-1,3-di(2-hydroxyethyl)bartituric acid, p-diethylaminocinnamylidenecyanoacetic acid, 2-(4-dimethylaminocinnamylidene)-1,3-cyclohexanedione, 4-acetoxy-3-(p-dimethylaminocinnamylidene)-2H-pyran-2,6(3H)-dione, 2-p-dimethylaminocinnamylidene-5-methyl-7H-thiazolo[3,2-a]pyrimidine-3,7-(2H)-dione, 1,3-diethyl-5-(2-methyl-6-p-dimethylaminostyryl-4H-pyran-4-ylidene)barbituric acid, 4-dicyanomethylene-6-methyl-2[(1,2,-3,4-tetrahydro-6-quinolyl)vinyl]-4H-pyran, 4-dicyanomethylene-6-methyl-2-[(9-methyl-3-carbazolyl)vinyl]-4H-pyran, 4-dicyanomethylene-2-{[9-(1,2,6,7-tetrahydro-3H,5H-benzo[i,j]-quinolizinyl)]vinyl} -6-methyl-4H-pyran, 2-{p-[bis(ethoxycarbonylmethyl)-amino]styryl}-4-dicyanomethylene-6-methyl-4H--pyran, 4-dicyanomethylene-2-p-(di-n-propylamino)styryl-6-methyl-4H-pyran, and 4-dicyanomethylene-2-[(5-indolinyl)vinyl]-6-methyl-4H-pyran.

20. The invention as described in claim 17 wherein p is equal to 1, R and $R^1$ each represents aa methyl radical, D and D' each represents a cyano radical and $R^6$ represents a hydrogen atom, a methyl radical or a phenyl radical.

* * * * *